United States Patent [19]

Balaud et al.

[11] 4,310,958

[45] Jan. 19, 1982

[54] PRODUCTION-LINE AUTOMATIC MACHINE

[75] Inventors: Daniel Balaud, Fontenay Aux Roses; Gaston Keledjian, Boulogne-Billancourt; Jean R. Passemard, Bailly-Roma Invilliers, all of France

[73] Assignee: Regie Nationale des Usines Renault, Boulogne-Billancourt, France

[21] Appl. No.: 965,993

[22] Filed: Dec. 4, 1978

[30] Foreign Application Priority Data

Dec. 7, 1977 [FR] France ................................. 77 36855
May 24, 1978 [FR] France ................................. 78 15445

[51] Int. Cl.³ .......................... B23K 9/12; B23Q 3/155
[52] U.S. Cl. .................................. 29/26 A; 219/86.7; 219/125.1; 414/744 R
[58] Field of Search ............... 29/568, 26 A; 414/723, 414/729, 744 R; 219/86.7, 125.1; 409/233; 408/35

[56] References Cited

U.S. PATENT DOCUMENTS

| | | | |
|---|---|---|---|
| 3,171,327 | 3/1965 | Williamson | 29/26 A X |
| 3,254,567 | 6/1966 | Daugherty | 409/233 |
| 4,046,263 | 9/1977 | Cwycyshyn et al. | 29/264 X |
| 4,057,881 | 11/1977 | Stephens | 408/35 |
| 4,145,802 | 3/1979 | d'Auria | 29/568 |

*Primary Examiner*—Z. R. Bilinsky
*Attorney, Agent, or Firm*—Fleit & Jacobson

[57] ABSTRACT

A production-line robot comprising an operative arm provided at its outer, pivoted end with a support mechanism is coupled via the latter to one of a plurality of tools associated with the robot, the tools being supported in their inoperative position by lock plates or bolts operable by the tool holder of the robot arm. The lock plates may comprise a tool receiving support provided with centering members with which a tool bearing plate is adapted to co-operate in the inoperative tool position, the bearing plate and the end support of the robot comprising mutual centering mechanisms, at least one of them being provided with controlled coupling and uncoupling members so that the robot can pick up and become coupled with one tool automatically and, after using this tool, deposit same upon the corresponding receiving support for subsequently picking up and becoming coupled with another tool waiting on its relevant receiving support.

7 Claims, 15 Drawing Figures

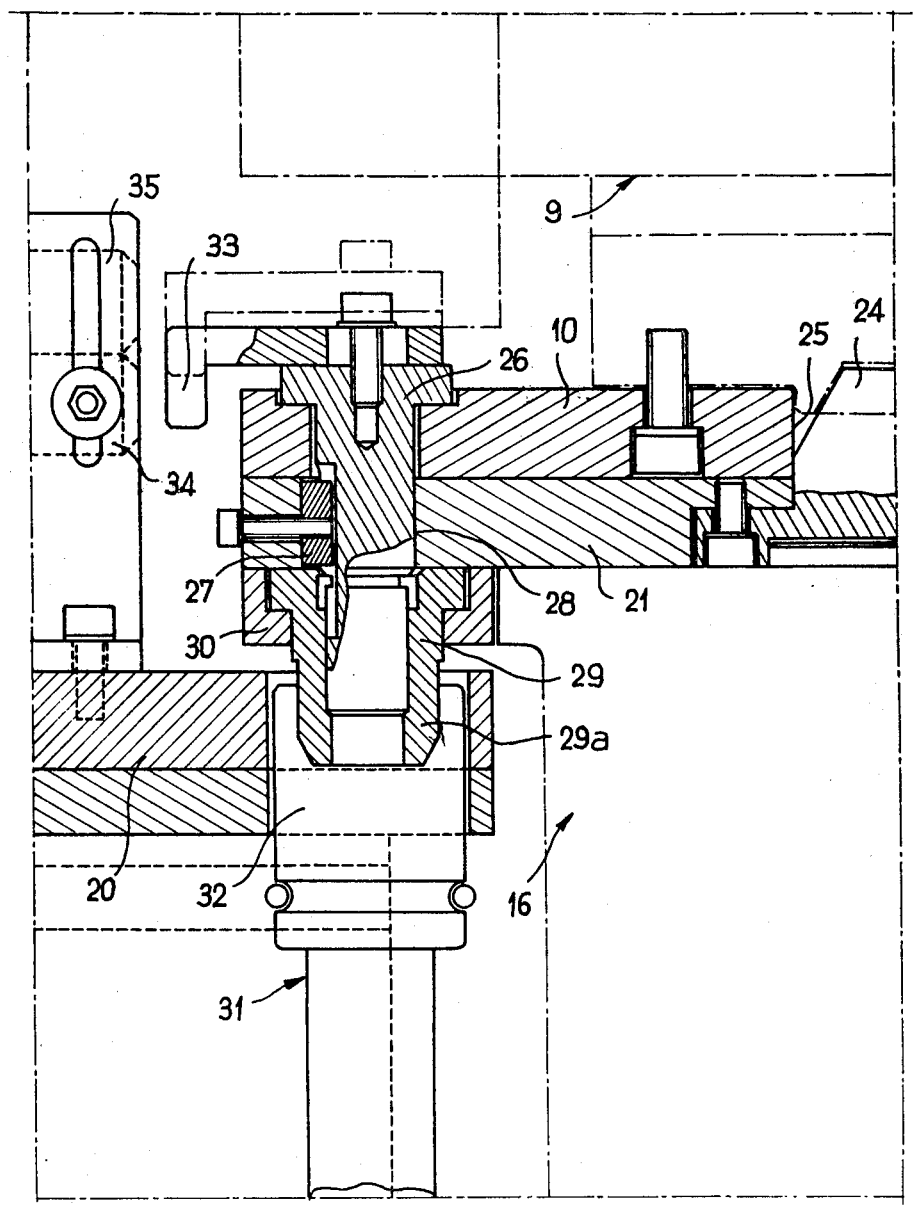
FIG_6

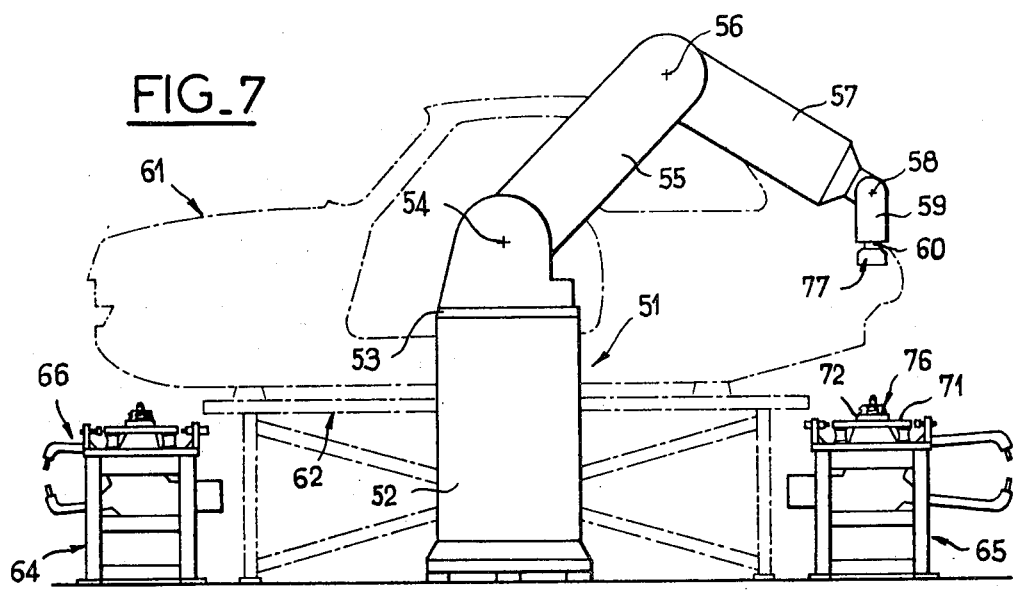
FIG_7
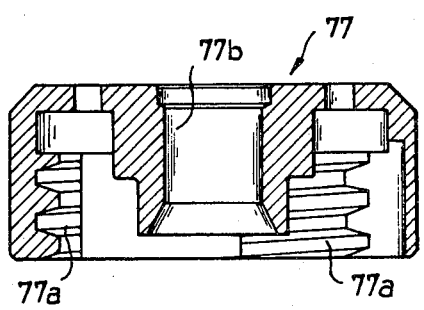
FIG_11
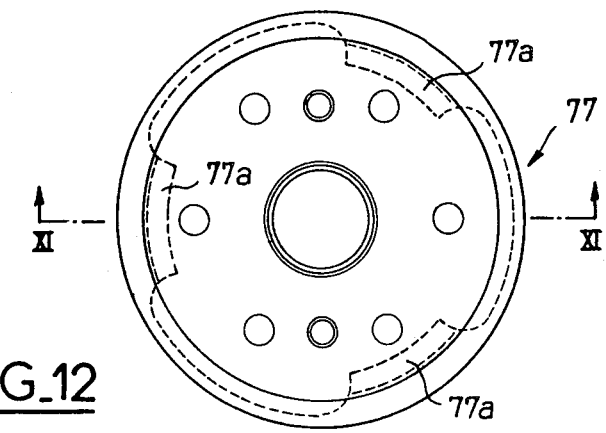
FIG_12

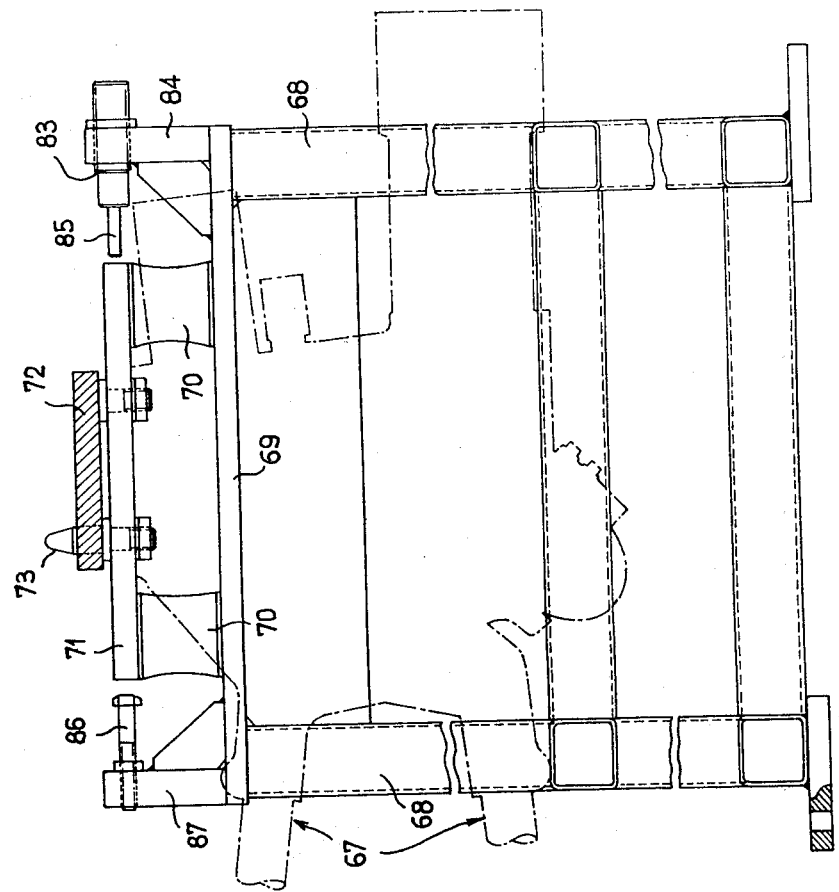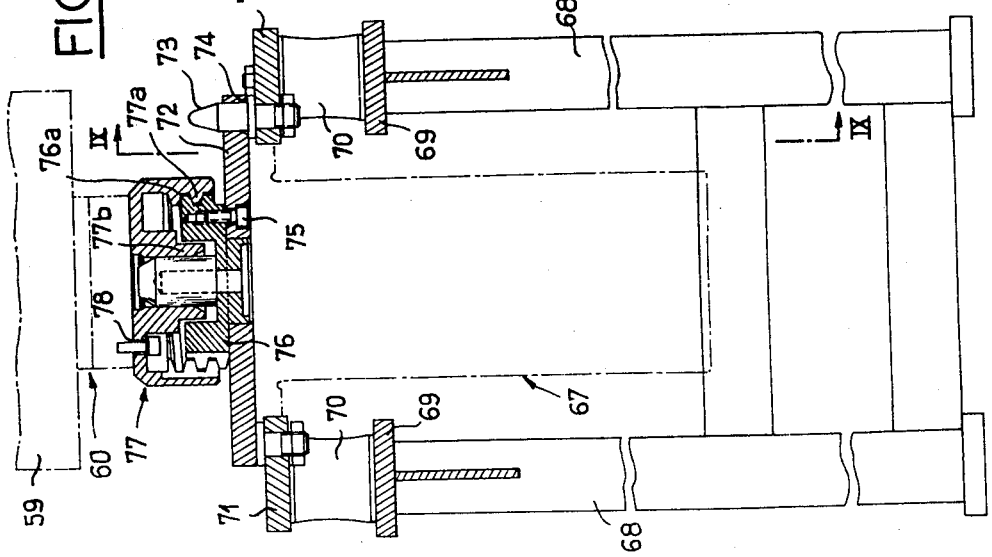

PRODUCTION-LINE AUTOMATIC MACHINE

This invention relates to production-line automatic machines or robots. The development of automation in production lines has been limited by the fact that up to now the machines or robots implemented therein have been designed for performing only a well-defined operation through the medium of a terminal support for coupling a tool controlled by the machine.

It is the primary object of the present invention to overcome this inconvenience by providing means enabling an automatic production machine or robot to operate with more than one tool, in a way both simple and advantageous, considering the considerable developments that can be expected from the use of automatic machines of this improved type.

Basically, for this purpose, the production-line robot according to this invention, which comprises a terminal tool coupling holder adapted to perform the various movements of the machine, is characterized in that it comprises at least two auxiliary tool-changing devices comprising each, in turn, a tool-receiving support incorporating centering means adapted to co-operate with a bearing plate in the inoperative tool position, said bearing plate and said terminal holder of the machine comprising mutually centering members, at least one of said centering members incorporating controlled means for mutually coupling and releasing said members, so that the machine can change automatically the tool to be put into service by depositing the tool in actual service upon its receiving support and coupling its holder to another tool waiting on its corresponding receiving support.

Moreover, according to a particularly advantageous form of embodiment, the terminal tool holder incorporates one of the coupling members for coupling the selected tool in response to one of the machine movements, this coupling action being produced solely by the machine power and control.

In this specification the term "tool" designates all means having a generally well-defined or specialized function, such as screw-driving, grinding, gun-welders, handling clamps, and the like, which it is possible to change according to the specific operations to be performed by the machine or as a function of the part or assembly on which the machine is to operate in the case of selective, for instance handling, steps.

The mechanical contact between the robot constituting as a rule a rigid unit and each tool resting on its receiving support is advantageously obtained under simple and reliable conditions by using a "floating" support, notably by mounting the support on resilient blocks or pads.

The arrangements broadly set forth hereinabove are consistent with a reasonable tool change time for example in the case of automobile mass production, and they can nevertheless be obtained without impairing the reliability and precision of the removable couplings between the machine and the clamps, in order to preserve a satisfactory fidelity in the performance of handling or other operations carried by means of the tools contemplated.

Other features and advantages of this invention will appear as the following description proceeds with reference to the attached drawings illustrating diagrammatically two exemplary forms of embodiment of the present invention. In the drawings:

FIG. 6 is a detail view showing in axial section a controlled clamping device for coupling the gun welders to the machine.

FIG. 7 is an elevational view showing a modified form of embodiment of a welding station for car bodies, which comprises a main automatic machine and two auxiliary gun welder changing devices.

FIG. 8 is an elevational view showing on a larger scale and in section taken along the line VIII—VIII of FIG. 10 an auxiliary device for changing the gun welders, with coupling means between the terminal support of the machine and the gun welders.

FIG. 9 is an elevational and sectional view taken along the line IX—IX of FIG. 8.

FIG. 11 is a detail view showing in section taken along the line XI—XI of FIG. 12 the nut acting as a fastening support.

FIG. 12 is a plan view from above of the nut shown in FIG. 11.

Figure 1:
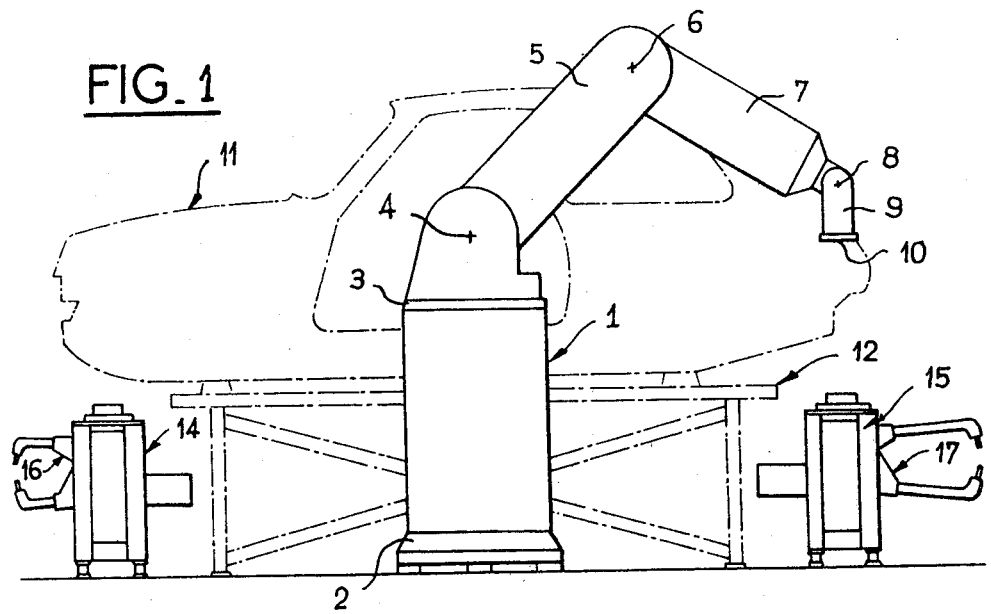
FIG. 1 is an elevational view of a welding station for car bodies, which comprises an automatic robot or like machine with two auxiliary devices for changing the gun welders.
Figure 2:
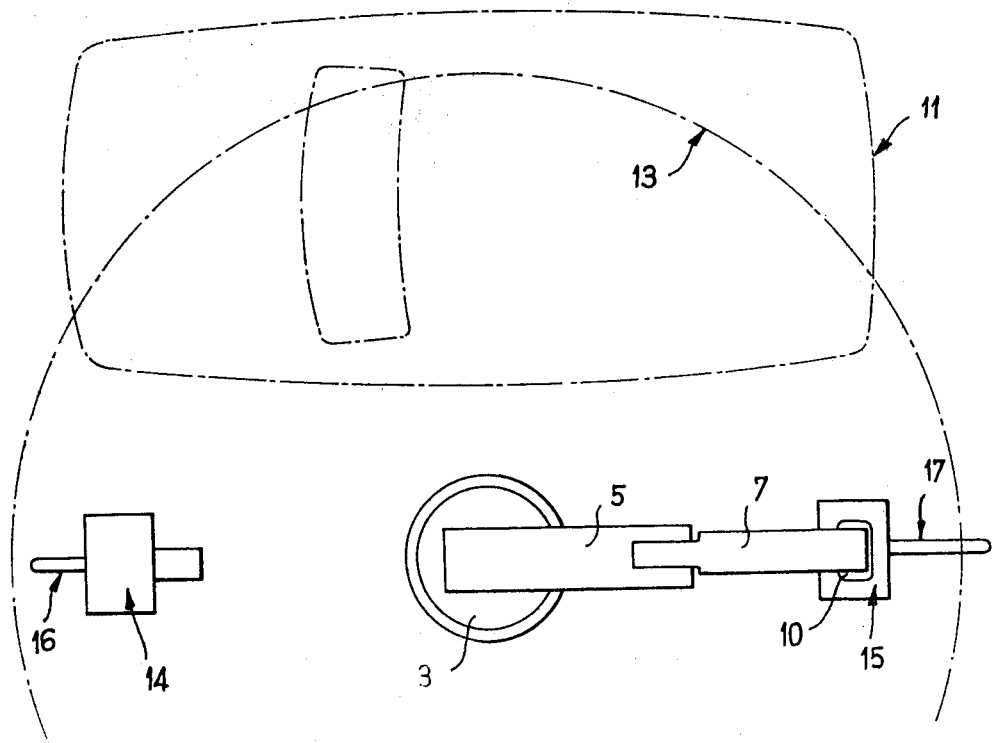
FIG. 2 is a plan view from above of the welding station of FIG. 1.
Figure 5:
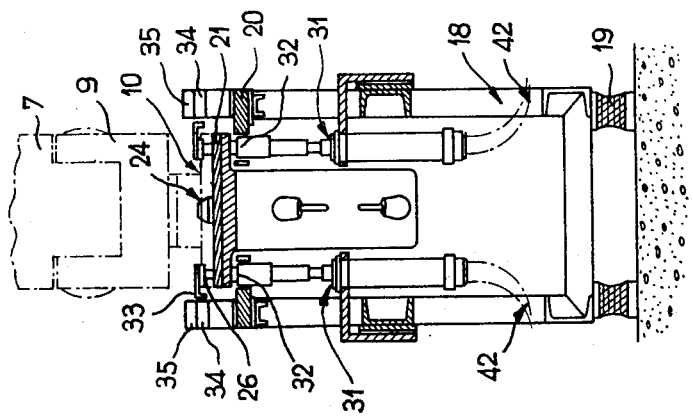
FIG. 5 is a partial section taken along the line V—V of FIG. 3.
Figure 3:
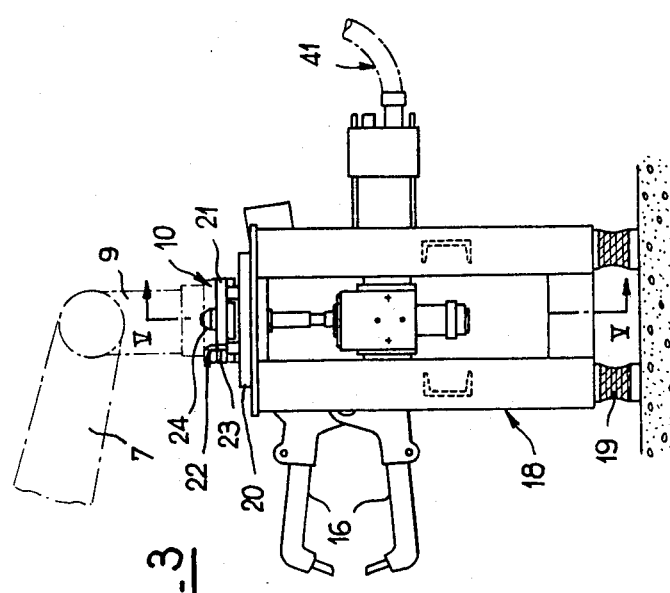
FIG. 3 is an elevational view showing on a larger scale one of the auxiliary devices of the station for changing the gun welders.

In the welding station illustrated in FIGS. 1 and 2 of the drawings, the automatic machine or robot proper is designated in general by the reference numeral 1 and comprises a stand rigid with a base plate 2 anchored to the floor, said stand supporting a platform 3 adapted to revolve about a vertical axis and formed with integral strap-forming flanges pivotally supporting at 4 an arm 5 pivotally assembled in turn at 6 to another arm 7 pivotally supporting at its free outer end, by means of a transverse pivot pin 8, a holder 9 provided at its free end with an end coupling support 10 adapted to co-operate with a gun welder constituting one of the tools to be operated by the machine. A car body 11 is shown in phantom lines as registering with the welding station and supported by a platform 12, the arc 13 illustrating in FIG. 2 the radius of operation of the automatic machine. Two auxiliary devices for changing the gun welder are illustrated diagrammatically at 14 and 15, each device being adapted to carry a pair of gun welders 16, 17 to be coupled alternatively to the machine arm end support 10.

Each auxiliary device 14, 15, as illustrated more in detail in FIGS. 3 to 6 inclusive, consists of a frame structure 18 made of four braced uprights bearing on the floor through the medium of four resilient blocks or pads 19 and provided at its upper portion with a pair of spaced cross plates or like members 20 constituting the receiving supports for a bearing plate 21 rigid with the relevant gun welder. This bearing plate 21 and each plate 20 are provided with matching centering means consisting in this case of a pair of cylindrical, taper-headed studs 22 secured to plates 20 and corresponding to a pair of holes 23 formed in the bearing plate 21 and fitting on the cylindrical portion of studs 22 in the inoperative condition of the gun welders.

The bearing plate 21 comprises at its upper portion a centering member corresponding to the end support 10 of the automatic machine, this member consisting in this example of a cylindrical centering stud 24 formed with a tapered head and adapted to fit in a hole 25 formed in the end support 10 and engageable on the cylindrical portion of stud 24 (see FIG. 6).

As also shown in FIG. 6, the bearing plate 21 carries the driven members for coupling with the end support 10, which comprises a pair of clamping-head rods 26 mounted for axial movement and guided by a key 27 engaging a keyway 28 formed in the bearing plate 21, the lower end of these rods 26 having a screw and nut connection, with a driving nut 29 mounted for rotation but held against axial movement in a case 30 forming an insert under the plate 21, the polygonal nut head 29a projecting from the case 30.

To actuate the pair of nuts 29 supported by the bearing plate 21 the frame structure 18 comprises a pair of pneumatic screw-drivers 31 of conventional type, adapted to rotate in either direction and provided with sockets 32 for engaging the nuts 29.

An element capable of detecting the clamping or release position of the clamping heads 26, which consists in this case of a ferromagnetic shunt 33 co-operating with a pair of staggered magnetic switches 34, 35, is secured to each clamping head 26. Thus ferromagnetic shunt 33 is adapted to control said staggered magnetic switches 34, 35 by actuating same as front contact means, so that in the clamping position the magnetic switch 34 will be closed and in the release position it is the other switch 35 that is closed.

In this example, the end support 10 of the automatic machine or robot consists of a flange pivotally mounted to the outer end of holder 9 about an axis perpendicular to that of the pivot pin 8 of this holder and therefore vertical when the assembly 9, 10 co-operates with each auxiliary device 14 or 15.

Figure 4:
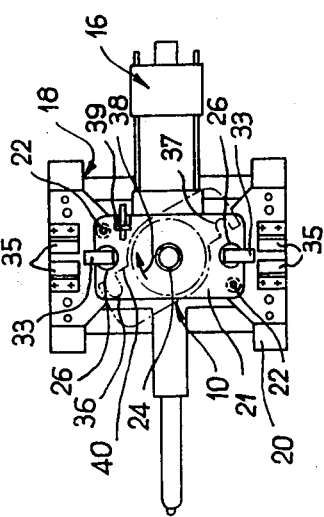
FIG. 4 is a plan view from above of the device of FIG. 3.

As shown in FIG. 4 the flange-like support 10 has two notches 36, 37 formed therein at two diametrally opposed positions with respect to its pivot axis, said notches being adapted to co-operate with the clamping-head rods 26 by pivoting in the direction shown by the arrow 38. The movement of said support 10 towards its clamping position is controlled by means of an electric micro-switch 39 secured to the bearing plate 21 and adapted to be actuated when this switch abuts one portion 40 of the flange-like support 10.

The flexible feed and control electric connections for the gun welder are shown at 41 and may be disposed in any suitable and conventional manner so that the gun welder may cover the desired area of operation, the reference numeral 42 designating the pneumatic conduits or hoses leading to the screw-drivers 31 mounted in a fixed position on the frame structure. This installation operates as follows:

From an initial position of the robot wherein the latter is not coupled to any gun welder, as shown in FIGS. 1 and 2, wherein the end holder 10 in the form of a coupling flange is disposed vertically above one of the auxiliary devices comprising the different gun welders, the robot causes this flange support to move vertically downwards so that its central hole 25 fits on the cylindrical portion of the centering stud 24 until it bears on the bearing plate 21 of the gun welder assembly in a waiting position on the auxiliary device 14 or 15, the flange support 10 having in this case an angular position corresponding to that shown in phantom lines in FIG. 4. The resilient blocks or pads 19 facilitate the obtaining of this mutual centering and engagement movement, and when the corresponding vertical positioning of the flange support 10 is obtained, the robot causes by itself the rotation of the flange-support 10 of which the notches 36, 37 engage the rods of the clamping heads 26.

When this engagement is completed, the electric micro-switch 39 is actuated to start the screwing of the units 29 by means of the screw-drivers 31 equipping the auxiliary devices. Thus, the nuts 29 will cause the axial movement of the clamping-head rods 26 so as to clamp the flange support 10 on the bearing plate 21 of the gun welder. Each screw-driver 31 is stopped automatically when a predetermined tightening torque is obtained, as conventional with machines of this type, and the two lower magnetic switches 34 acting as front contacts by the magnetic shunt 33 of each clamping head 26 enable the robot to withdraw the corresponding gun welder outside its waiting support in order to perform the welding operation programmed for this gun welder.

When the welding operation is completed, the robot deposits the gun welder upon the supporting platform 20 of its bearing plate 21, the mutual centering action being provided by the studs 22 and holes 23. Also in this case this engagement is facilitated by the resilient blocks or pads 19.

When the corresponding vertical positioning of the flange-support 10 is obtained, the robot permits the unscrewing function of the screw-drivers 31 (of which the sockets 32 rotate the nuts 29 in the opposite or release direction) to take place, so that the clamping-head rods 26 move upwards and release the flange-support 10, and each upper magnetic switch 35 is actuated to its closed position by the magnetic shunt 33 having reached the same level, so as to stop the operation of the corresponding screw-driver 31 (to prevent the nut 29 from being disengaged completely from the threaded portion of the clamping-head rod 26) and permit the robot operation for pivoting the flange-support 10 to its release position with respect to the clamping-head rods 26 (this movement consisting of a rotation in the direction opposite that of the arrow 38).

Then, the robot is ready for "picking up" the other gun welder as explained hereinabove, in order to perform the next programmed welding operation and, upon completion of this operation, to deposit this second gun welder upon the corresponding auxiliary device as also disclosed in the foregoing.

Of course, it will be seen that this invention is applicable to all known types of automatic machine or robot capable of performing the movements contemplated; besides, it is not compulsory that this automatic machine or robot be equipped with a flange-support capable of pivoting in the manner set forth in the above-described example, for the controlled members for mutually coupling the gun welder and the robot may themselves be of a type retractable at the end of the release step, without departing from the basic principle of the invention.

In the welding station illustrated in FIG. 7 the automatic machine or robot is designated in general by the reference numeral 51 and comprises a stand 52 anchored to the floor and supporting a platform 53 adapted to revolve about a vertical axis and formed with integral flanges having pivotally mounted therebetween at 54 an arm 55 pivoted in turn to an outer arm 57 to which a holder 59 is pivoted by means of a pivot pin 58 parallel to pivot pins 54 and 56, said holder 59 being provided with an end support 60 for coupling same with a gun welder to be associated with the robot.

The end support 60 is pivoted to the holder 59 by means of a pivot pin perpendicular to the pivot pin 58, so as to extend vertically in the robot position illustrated. The various movements of this robot may be obtained through any suitable means, and it will be seen that in this specific robot both the structure and the mechanisms controlling the possible compound movements are not an integral part of the invention and may therefore be of any desired and suitable type well known in the field of automation.

A car body to be welded illustrated at 61 is supported by a bed 62. In addition, there are also shown at 64 and 65 auxiliary devices for changing the gun welder and each device is adapted to support one of the gun welders 66, 67 to be associated with the robot.

Each auxiliary device 64, 65 comprises a frame structure consisting of four braced uprights 68 supporting at a same level a pair of parallel flat irons 69 having each secured thereto a pair of spaced resilient blocks 70 supporting each a side plate 71, these two plates 71 forming together a support for receiving in the inoperative position the bearing platform 72 rigid with the corresponding gun welder.

This platform 72 and each side plate 71 are provided with mutually engaging centering members consisting in this example of stud 73 having an ogive-shaped head secured to each side plate 71, each stud 73 corresponding to a hole 74 formed through the platform 72 and adapted to fit on the relevant stud 73.

Fastened by means of screws 75 to the top of platform 72 and centered by means of suitable studs is a centering and coupling member 76 adapted to co-operate with a matching centering and coupling member 77 secured to the end coupling support 60 by means of screws 78 and centering studs (not shown).

Figure 15:
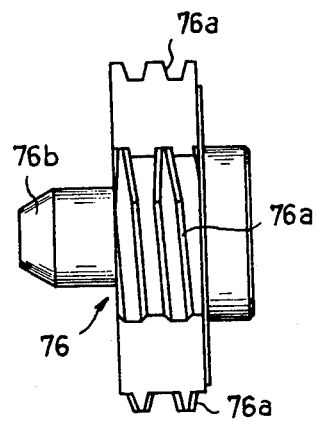
FIG. 15 is an elevational view of the screw of FIG. 14 as seen in the direction of the arrow XV thereof.
Figure 14:
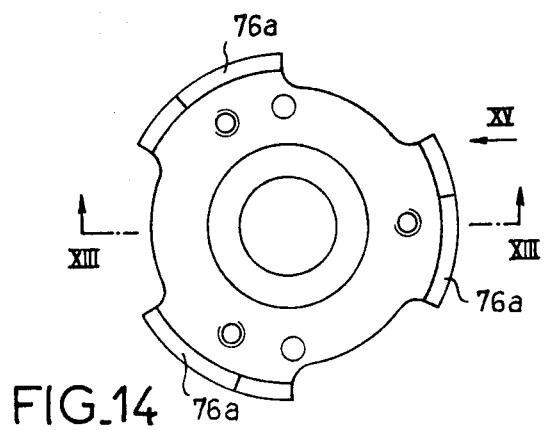
FIG. 14 is a plan view from above of the coupling screw of FIG. 13.

The member 76 comprises a coupling screw having thread 76a discontinued on three equally spaced sectors separated by a gap of about 60°, each thread end being bevelled in this case to an angle of 20° as shown in FIGS. 14 and 15. The member 76 also comprises in its central portion a cylindrical centering stud 76b having a tapered top portion and constituting the solid guide axis for the other coupling member 77. In fact, the other coupling member 77 constitutes a kind of cap-nut 77a having its internal threads discontinued to form three threaded sectors separated by a gap of about 80°, with a central cylindrical centering bore 77b having an outflared or bevelled lower end for centering the nut on the screw during the mutual axial movement thereof before they can be coupled to each other by screwing.

Figure 10:
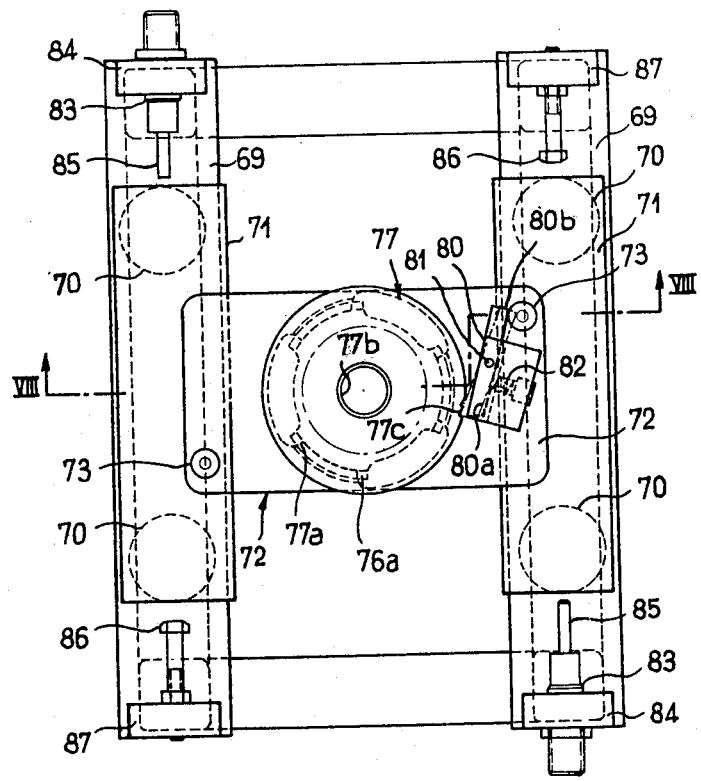
FIG. 10 is a plan view from above of the assembly shown in FIG. 8.
Figure 13:
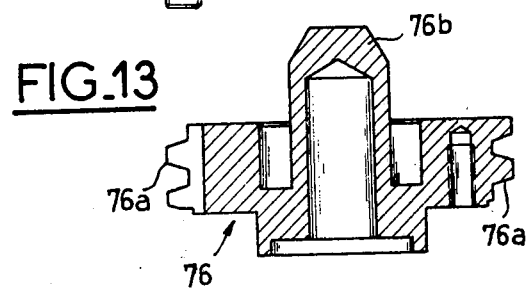
FIG. 13 is a detail view showing in section taken along the line XIII—XIII of FIG. 14 the coupling screw carried by the bearing base plate of a clamp or pair of jaws.

Furthermore, the platform 72 comprises a bolt 80 pivoted in a strap to a pin 81 and responsive to a spring 82 constantly urging a tooth 80a thereof to the position shown in phantom lines in FIG. 10, so as to lock the coupling member by engaging a peripheral notch 77c thereof.

However, in the inoperative position of the bearing platform 72 on its receiving and supporting side plates 71, the bolt end 80b co-operates with the adjacent centering stud 73 which acts in this case as a means for retracting the bolt 80 when the elements to be welded resume their inoperative position, and as a cam for releasing the bolt 80 locking the coupling between the robot and the selected gun welder when the latter is lifted.

Each part to be welded may be supplied with welding current through flexible cables (not shown) disposed as conventional to enable the gun welder to cover the desired area of operation.

This modified arrangement operates as follows:

From a robot position such that no welding means are engaged by the holder 60, as illustrated in FIG. 7, wherein this end holder 60 provided with a coupling nut 77 is disposed vertically above the coupling screw 76 of a gun welder, controlling the robot for picking up this gun welder will cause the assembly 60-77 to move vertically downwards so that the bore 77b of the coupling nut will engage the ensuring stud 76b of coupling screw 76, thus centering the mutual axial centering of threads 76a and 77a which in this case is subordinate to the programmed approach stroke of the robot, the resilient blocks 70 facilitating this approach and the centering action between the coupling nut and screw during this stage. Then, the end support 60 with its coupling nut 77 is rotated by the robot control about its abovementioned vertical axis, through the angle necessary for screwing the threads 77a of the nut on the threads 76a of the screw, the robot controlling the proper rotation so that the screwing angle corresponds to the proper relative engagement of the assembly 60-77. It will be noted in this respect that if the robot, like any conventional robot, is adapted to control the proper performance of the controlled movements by checking the position of the members concerned, it cannot, basically, unless special devices are added thereto, control the efforts produced during its movements, though this control would be highly desirable in this particular case in order to improve the safety of operation, so that the tightening torque between the nut 77 and screw 76 be properly limited since, for well-known mechanical reasons, the release torque necessary for uncoupling the parts happens to be higher than the tightening torque without exceeding in fact the torque capacity of the robot rotation drive controlling this operation.

This differentiation is introduced in this case into each auxiliary device 64, 65 by associating with the resilient blocks 70 affording a certain movement of the receiving support 71 means capable of modifying the reaction applied to support 71 to the coupling action in relation to that applied when uncoupling the parts.

These means, as far as the coupling reaction is concerned, consist of a pair of hydraulic dampers of which the cylinders 83 are secured within supports 84 at the two opposed ends of the flat irons 69, the piston rods 85 of these cylinders registering with the relevant ends of side plates 71 for which they act somewhat as bearing members adapted to yield under the resistant force of dampers during the screwing phase of the coupling between the nut 77 and screw 76, thus limiting the permissible tightening torque.

In contrast thereto, opposite these dampers, abutment members 86 secured in supports 87 to the flat irons 69 register with the relevant ends of side plates 71 for which they act as fixed bearing members when the resilient blocks have yielded as a consequence of the reaction to the uncoupling effort produced between the nut 77 and screw 76, so that the release torque may be the maximal torque that can be exerted by the corresponding rotary drive means from the robot.

It will also be seen that when the coupling action is completed as described hereinabove, the positions of nut 77 and screw 76 being those shown in FIG. 10, when the robot lifts the corresponding gun welder the end 80b of bolt 80 will escape the adjacent centering stud 73 and its tooth 80a will engage the locking notch 77c of the nut, so that the latter, during the release operation, is held against movement in relation to the bearing plate 72 of the gun welder.

When the robot has accomplished the programmed operation with the corresponding gun welder, it deposits the latter upon the auxiliary welder change device by approaching same vertically so that the centering holes 74 of the bearing plate 72 of said gun welder will center themselves on the relevant studs 73 of the pair of side plates 71 forming the gun-welder receiving support, the resilient blocks 70 facilitating this approach and mutual engagement by damping out any detrimental shock. The bolt 80 is then retracted in relation to the nut notch 77c to the cam action exerted by the adjacent centering stud 73 on its end 80b.

The end holder 60 provided with the coupling nut 77 may then be rotated by the robot drive means through the angle necessary for unscrewing the nut 77 in relation to the screw 76, with the necessary and if required maximal torque, as explained in the foregoing, with due consideration for the bearing engagement between the side plates 71 of the receiving support and the fixed stops 86.

The robot thus uncoupled from the gun welder just operated thereby is free for picking up the other gun welder and laying it down after using it, according to the same procedure as the one depicted in the foregoing.

Moreover, it will be seen that with this production-line automatic machine it is also possible to feed the tool with power from the robot proper by using fast-connecting means, notably of the plug-in type, carried by the end holder 60 and the bearing plate 72 of the tool so as to provide an automatic coupling during the same movement accomplished by the robot as the one necessary for coupling it with the tool concerned, in this case by rotating the end holder 60.

These fast-coupling means may also be used for transmitting power in the form of electric current or fluid under pressure, so as to avoid the use of cumbersome flexible cables and hoses for powering the tools while facilitating the possible movements of the tools themselves.

Of course, many modifications and changes may be brought to the specific forms of embodiment of the invention shown and described herein by way of example, without departing from the basic principles of the invention set forth in the appended claims, as will be readily understood by those skilled in the art.

What is claimed as new is:

1. A production-line robot assembly comprising a robot and an end tool-coupling support intended to be coupled with interchangeable tool assemblies, the end tool-coupling support being responsive to various robot movements during depositing and removal of tool assemblies by the robot, each tool assembly comprising a tool and a bearing plate fast with the tool, said robot assembly comprising a receiving support for each tool assembly, and resilient mounting means for resiliently supporting said receiving support so that the receiving support is axially and laterally movable in response to robot movements during depositing and removal of tool assemblies, said receiving support and said bearing plate of each tool assembly comprising reciprocal centering means for centering the tool assembly on the receiving support in a resting condition of the tool assembly, said end tool-coupling support for tool assemblies and each bearing plate comprising means for causing the mutual centering thereof in a picking-up condition of the tool assembly, said resilient mounting means facilitating approach and centering action between said end tool-coupling support and said bearing plate, and at least one of said end tool-coupling support and bearing plate comprising controlled members adapted to cause their mutual coupling and uncoupling.

2. Production-line robot as set forth in claim 1, wherein the controlled members for coupling and uncoupling the tool in relation to the robot are members of the tightening and release type and that said receiving support comprises at least one powered screw-driver adapted to co-operate with said members.

3. Production-line robot as set forth in claim 2, wherein said end support is a pivoting flange adapted to co-operate with or be released from the controlled coupling members carried by said bearing plate, said controlled coupling members consisting of rods comprising each an axially movable clamping head the axial movement type with a central screw and nut assembly, the latter assembly being adapted to be operated by the relevant screw-driver in either direction.

4. A production-line robot as set forth in claim 1 wherein said mutual coupling and uncoupling members consist of screw and nut assemblies respectively fast with said end support and bearing plate and having their threads divided by axial channels into regularly spaced sectors adapted to be brought into proper mutual axial relationship before screwing them to each other, said end support being subjected to an angular pivotal movement for screwing or unscrewing said members, and said means for causing the mutual centering of said end support and said bearing plate defining an axis of the screwing or unscrewing movement.

5. A production-line robot as set forth in claim 4, wherein said resilient mounting means is adapted to have a reaction stiffness to the coupling by screwing of said end support with said bearing plate which is less than its reaction stiffness to the uncoupling by unscrewing.

6. A production-line robot as set forth in claim 4, wherein said resilient mounting means comprises resilient blocks, wherein said robot comprises at least one damper and at least one fixed stop for said receiving support, and wherein said receiving support is adapted to cooperate with said at least one damper during the coupling and to cooperate with said at least one fixed stop during the uncoupling of said end support and said bearing plate.

7. A production-line robot as set forth in claim 4, wherein each bearing plate of a tool assembly carries a bolt for locking said coupling member which is fast with said end support, said bolt cooperating with said reciprocal centering means which act as a bolt control cam to unlock said last-mentioned coupling member in the resting condition of the tool and to lock it when the tool is departing from its resting condition.

* * * * *